US011907403B2

(12) United States Patent
Ou et al.

(10) Patent No.: US 11,907,403 B2
(45) Date of Patent: Feb. 20, 2024

(54) DYNAMIC DIFFERENTIAL PRIVACY TO FEDERATED LEARNING SYSTEMS

(71) Applicant: Hong Kong Applied Science and Technology Research Institute Co., Ltd., Shatin (HK)

(72) Inventors: Jitao Ou, Sha Tin (HK); Jiazheng Yan, Sai Wan (HK); Wenjun Zhuang, Hung Hom (HK); Kam Hong Shum, Taikoo Shing (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 475 days.

(21) Appl. No.: 17/344,893

(22) Filed: Jun. 10, 2021

(65) Prior Publication Data
US 2022/0398343 A1 Dec. 15, 2022

(51) Int. Cl.
*G06F 21/62* (2013.01)
*G06N 20/00* (2019.01)
(Continued)

(52) U.S. Cl.
CPC ......... *G06F 21/6254* (2013.01); *G06N 3/098* (2023.01); *G06N 20/00* (2019.01);
(Continued)

(58) Field of Classification Search
CPC .... G06F 21/6254; G06N 3/098; G06N 20/00; G06N 3/084; G06N 3/0985; H04L 9/008; H04L 2209/42; H04L 2209/46
See application file for complete search history.

(56) References Cited

U.S. PATENT DOCUMENTS 7,856,100 B2 12/2010 Wang et al.
10,171,476 B2 1/2019 Khan
(Continued)

FOREIGN PATENT DOCUMENTS

CN 109933603 A 6/2019
CN 110647765 A 1/2020
(Continued)

OTHER PUBLICATIONS

Geyer, Robin C. et al. "Differentially Private Federated Learning: A Client Level Perspective," 31st Conference on Neural Information Processing Systems (NIPS 2017), 7 pages.
(Continued)

*Primary Examiner* — Cheng-Feng Huang
(74) *Attorney, Agent, or Firm* — Norton Rose Fulbright US LLP

(57) ABSTRACT

Embodiments of the present disclosure provide hierarchical, differential privacy enhancements to federated, machine learning. Local machine learning models may be generated and/or trained by data owners participating in the federated learning framework based on their respective data sets. Noise corresponding to and satisfying a first privacy loss requirement are introduced to the data owners' respective data sets, and noise corresponding to and satisfying a first privacy loss requirement are introduced to the local models generated and/or trained by the data owners. The data owners transmit model data corresponding to their respective local models to a coordinator, which in turn aggregates the data owners' model data. After introducing noise corresponding to and satisfying a third privacy loss requirement to the aggregated model data, the coordinator transmits the aggregated model data to the data owners to facilitate updating and/or re-training on their respective machine learning models.

20 Claims, 7 Drawing Sheets

(51) Int. Cl.
*H04L 9/00* (2022.01)
*G06N 3/098* (2023.01)

(52) U.S. Cl.
CPC .......... *H04L 9/008* (2013.01); *H04L 2209/42* (2013.01); *H04L 2209/46* (2013.01)

(56) References Cited

U.S. PATENT DOCUMENTS

| | | | | |
|---|---|---|---|---|
| 10,390,220 | B2* | 8/2019 | Joy | H04L 63/0421 |
| 10,771,240 | B2* | 9/2020 | Carson | H04L 9/0637 |
| 11,070,357 | B2* | 7/2021 | Jankly | H04L 63/0428 |
| 11,146,535 | B2* | 10/2021 | Castagna | H04L 63/0407 |
| 2007/0208845 | A1* | 9/2007 | Raheman | H04L 63/0421 |
| | | | | 709/223 |
| 2011/0064221 | A1* | 3/2011 | McSherry | H04K 1/02 |
| | | | | 380/252 |
| 2017/0353855 | A1* | 12/2017 | Joy | H04W 12/02 |
| 2017/0372226 | A1* | 12/2017 | Costa | G06N 20/00 |
| 2018/0101848 | A1* | 4/2018 | Castagna | H04L 9/3236 |
| 2021/0241274 | A1* | 8/2021 | Shum | G06Q 20/383 |

FOREIGN PATENT DOCUMENTS

| | | |
|---|---|---|
| CN | 111310932 A | 6/2020 |
| CN | 111611610 A | 9/2020 |
| CN | 111898137 A | 11/2020 |
| CN | 112199702 A | 1/2021 |

OTHER PUBLICATIONS

Patent Cooperation Treaty, International Search Report and Written Opinion issued for PCT Application No. PCT/CN2021/101268, dated Mar. 2, 2022, 9 pages.

* cited by examiner

410

| Model Data | | | | | | |
|---|---|---|---|---|---|---|
| $ID_1$ | f(a) | f(b) | f(c) | ... | f(z) | Label |
| $ID_2$ | f(a) | f(b) | f(c) | ... | f(z) | Label |
| $ID_3$ | f(a) | f(b) | f(c) | ... | f(z) | Label |
| $ID_4$ | f(a) | f(b) | f(c) | ... | f(z) | Label |
| $ID_5$ | f(a) | f(b) | f(c) | ... | f(z) | Label |
| $ID_6$ | f(a) | f(b) | f(c) | ... | f(z) | Label |

420

| Model Data | | | | | |
|---|---|---|---|---|---|
| $ID_1$ | f(1) | f(2) | f(3) | ... | f(N) |
| $ID_2$ | f(1) | f(2) | f(3) | ... | f(N) |
| $ID_3$ | f(1) | f(2) | f(3) | ... | f(N) |
| $ID_4$ | f(1) | f(2) | f(3) | ... | f(N) |
| $ID_5$ | f(1) | f(2) | f(3) | ... | f(N) |
| $ID_6$ | f(1) | f(2) | f(3) | ... | f(N) |

430

| Model Data | | | | | |
|---|---|---|---|---|---|
| $ID_1$ | f(i) | f(ii) | f(iii) | ... | f(N) |
| $ID_2$ | f(i) | f(ii) | f(iii) | ... | f(N) |
| $ID_3$ | f(i) | f(ii) | f(iii) | ... | f(N) |
| $ID_4$ | f(i) | f(ii) | f(iii) | ... | f(N) |
| $ID_5$ | f(i) | f(ii) | f(iii) | ... | f(N) |
| $ID_6$ | f(i) | f(ii) | f(iii) | ... | f(N) |

| Model Data | | | | | | |
|---|---|---|---|---|---|---|
| $ID_1$ | f(1) | f(2) | f(3) | ... | f(N) | Label |
| $ID_3$ | f(1) | f(2) | f(3) | ... | f(N) | Label |
| $ID_4$ | f(1) | f(2) | f(3) | ... | f(N) | Label |

520

| Model Data | | | | | | |
|---|---|---|---|---|---|---|
| $ID_2$ | f(1) | f(2) | f(3) | ... | f(N) | Label |
| $ID_3$ | f(1) | f(2) | f(3) | ... | f(N) | Label |
| $ID_6$ | f(1) | f(2) | f(3) | ... | f(N) | Label |

530

| Model Data | | | | | | |
|---|---|---|---|---|---|---|
| $ID_1$ | f(1) | f(2) | f(3) | ... | f(N) | Label |
| $ID_5$ | f(1) | f(2) | f(3) | ... | f(N) | Label |
| $ID_6$ | f(1) | f(2) | f(3) | ... | f(N) | Label |

FIG. 5

DYNAMIC DIFFERENTIAL PRIVACY TO FEDERATED LEARNING SYSTEMS

TECHNICAL FIELD

The present invention relates to a methods and systems for dynamic differential privacy for federated machine learning.

BACKGROUND OF THE INVENTION

Machine learning (ML) involves computer algorithms that improve automatically through experience and by the use of data. Machine learning algorithms build a model based on input data, known as "training data", in order to make predictions or decisions without being explicitly programmed to do so. The amount of input data available for ML is a critical factor in determine the quality of results from ML algorithms. Federated learning is a form of distributed machine learning that trains various, parallel ML models. This technique increases efficiency by decentralizing the training process to many devices. However, it is difficult to share data that is separately stored and owned by different stakeholders (e.g., businesses, government agencies, medical providers, individuals, etc.) due to data privacy regulations. Moreover, the various stakeholders may be separate entities that are each concerned that sensitive analytics risk exposure from reverse-engineering on any ML models that may be shared in a federated learning framework.

Data privacy is a major concern because of the need to comply with data privacy regulations such as General Data Protection Regulation (GDPR) in EU and Personal Data (Privacy) Ordinance (PDPO) in Hong Kong. Other sovereignties have also implemented data privacy laws regulations, such as the California Consumer Privacy Act, the Russian Federal Law on Personal Data (Russian Federation), and the Data Protection Act 2018 (United Kingdom). As such, there are two areas of data privacy to be protected in the federated learning scenario: (1) data privacy of individuals (e.g., end-customers) whose private information are stored by service providers; and (2) the privacy of service providers whose confidential business intelligence can be exposed by running ML on their datasets. The potential benefits of providing data sharing without compromising data privacy are tremendous.

BRIEF SUMMARY OF THE INVENTION

The present application discloses systems, methods, and computer-readable storage media for applying differential privacy to distributed machine learning (e.g., federated learning). Embodiments of the present invention provide for dynamic differential privacy in the federated learning process so that different stakeholders (e.g., data owners) can share analytics while striking a balance between data transparency and privacy protection. The techniques disclosed herein utilize machine learning in a distributed environment that allows machine learning models to be generated and trained by different data owners. The resulting model data may be aggregated and shared between data owners to update their respective model(s) or generate new models that may provide a more comprehensive analyses. For example, a first data owner may be initially limited to generating "raw" ML models based on data sets that are directly in its possession. And the first data owner's modelling may be improved by incorporating modelling analyses performed by other data owners on their respective data sets, which may include information additive of or unavailable to the first data owner.

To ensure that the data sets of the first and second data owners are not divulged to each other, differential privacy may be applied to the input data to each ML model and to ML modelling data through, for example, the introduction of noise, anonymization, and encryption. Different, and preferably distinct, hierarchies of loss requirements may be dynamically applied to different stages and/or forms of data in a federal learning framework. For example, a first privacy loss requirement may be applied to input data (e.g., "raw" data, anonymized data, encrypted data, etc.), a second privacy loss requirement may be applied to ML modelling data generated by individual data owner(s), and a third privacy loss requirement may be applied to ML modelling data aggregated from multiple data owners. Applying differential privacy to input data sets derived from the data of multiple stakeholders (e.g., data owners) and to models generated by the same enables sensitive or private information to be used for federated learning, thereby overcoming the drawbacks of previous federated learning techniques.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein:

FIG. 4 is a block diagram illustrating exemplary aspects of federated learning in accordance with embodiments of the present disclosure;

FIG. 5 is a block diagram illustrating exemplary aspects of federated learning in accordance with embodiments of the present disclosure;

DETAILED DESCRIPTION OF THE INVENTION

Embodiments of the present disclosure provide systems, methods, and computer-readable storage media facilitating federated learning enhanced by differential privacy techniques. The disclosed embodiments utilize machine learning techniques to develop and train models that may be distributed to one or more different entities (e.g., data owners) while maintaining the privacy of underlying data. Modelling data may be generated by multiple data owners and provided to a coordinator. The coordinator may aggregate the modelling data or use the modelling data to refine model parameters and update a global model (or generate a new global model), which may be subsequently distributed to various data owners for use in further ML modelling. The disclosed techniques enable large sample sizes to be used to generate or train ML models and refine them over time without requiring different data owners to share underlying data between each other (or with the coordinator), thereby maintaining the confidentiality and privacy of each data owner's respect input data and model data.

Figure 1:
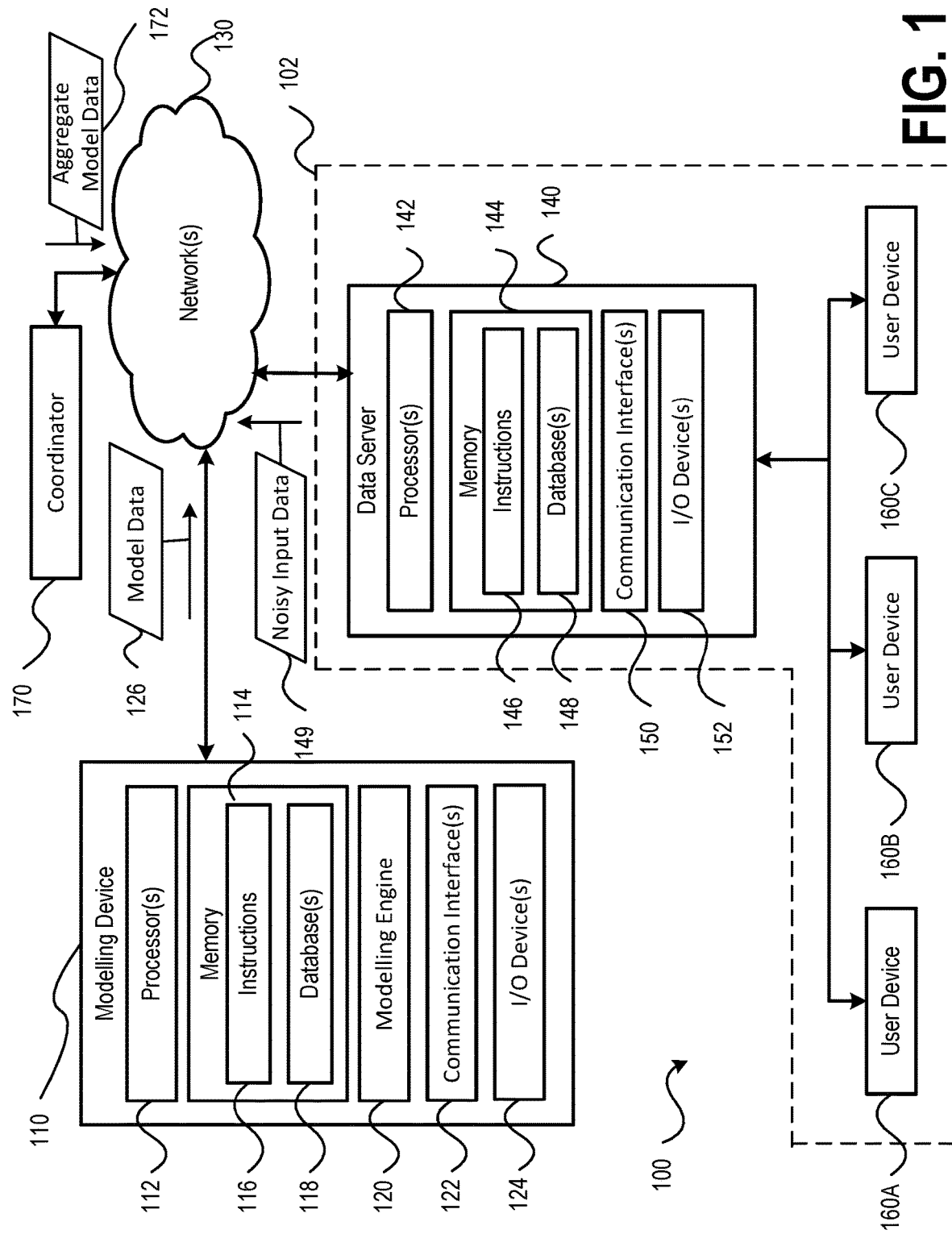
FIG. 1 is a block diagram of a system providing differential privacy for distributed techniques in accordance with embodiments of the present disclosure.

Referring to FIG. 1, an embodiment of a system for providing differential privacy is shown as system 100. As shown in FIG. 1, system 100 includes modelling device 110, network(s) 130, data server 140, and coordinator 170. Modelling device 110, data server 140, and coordinator 170 may be communicatively coupled to one another via network(s) 130. For example, modelling device 110 and/or data server 140 may use one or more Application Programming Interfaces (API) to interact with each other and with coordinator 170.

According to embodiments, data owner 102 may be a business or other type of entity that provides services to and possesses private information associated with a plurality of individuals (e.g., users). For example, data owner 102 may provide financial services (e.g., checking or savings accounts, brokerage funds, health savings accounts, mortgage company, etc.), utility services (e.g., electric, gas, water, sewage, satellite, broadband, television, etc.), transportation services (e.g., airline, train, etc.), merchant services (e.g., online shopping, movie theatre, etc.), insurance services (e.g., vehicle, life, medical, etc.), governmental services (e.g., social security, department of motor vehicles, veteran affairs, police, courts, prisons, etc.), education services (e.g., universities, K-12, etc.), other entities possessing private data information associated with an individual suitable for operations discussed herein (e.g., employer, property title company, etc.), or combinations thereof. It is noted that FIG. 1 shows a single data owner 102 for purposes of illustration, rather than by way of limitation, and that aspects of the present disclosure may be readily applied to identification and training of models across a plurality of data owners (e.g., organizations, entities, businesses, individuals, etc.), such as data owners 220 and 230 of FIG. 2, to provide differential privacy enhancements for federated learning.

As shown in FIG. 1, data owner 102 may include a network infrastructure that includes data server 140, and in some embodiments, may also include modelling device 110. It is noted that data server 140 and modelling device 110 are depicted and described separately for purposes of illustration, rather than by way of limitation, and that aspects of the present disclosure may be readily applied by a modelling server that combines the systems and operations of modelling device 110 and data server 140.

Data server 140 of embodiments may include one or more servers having one or more processors 142, memory 144, one or more communication interfaces 150, and one or more input/output (I/O) devices 152. One or more processors 142 may include one or more microcontrollers, application specific integrated circuits (ASICs), field programmable gate arrays (FPGAs), central processing units (CPUs) having one or more processing cores, or other circuitry and logic configured to facilitate the operations of the modelling device 110 in accordance with aspects of the present disclosure. Memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of data server 140 may be stored in memory 144 as instructions 146 that, when executed by one or more processors 142, cause the processor(s) to perform the operations described in more detail below with respect to data server 140. Additionally, memory 144 may be configured to store one or more databases 148. Exemplary aspects of one or more databases 148 are described in more detail below.

One or more communication interfaces 150 are preferably configured to communicatively couple data server 140 to one or more networks 130 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). One or more networks 130 may include local networks, wide area networks, or public networks (e.g., Internet). The one or more I/O devices 152 may include one or more display devices, a keyboard, a stylus, one or more touchscreens, a mouse, a trackpad, a camera, one or more speakers, haptic feedback devices, removable media drives, or other types of devices that enable a user to receive information from or provide information to data server 140.

Additionally, data server 140 may be communicatively coupled to one or more user devices (e.g., user devices 160A, 160B, and 160C) via communication interface(s) 150 and/or I/O device(s) 152. In operation according to embodiments, data server 140 may receive input data from one or more user devices (e.g., user devices 160A, 160B, and 160C) via communication interface(s) 150 and/or I/O device(s) 152 and store the same in database 148. Input data of embodiments may include information corresponding to one or more users related to services provided by data owner 102. In an aspect, input data may also include information generated by data owner 102 during interactions with one or more users. For example, the input data may represent an individual's bank account transactions, commercial transactions, academic history, criminal history, other forms of information consistent with interactions with data owners described herein, or combinations thereof. It is noted that FIG. 1 illustrates the plurality of user devices as including three user devices for purposes of illustration, rather than by way of limitation and the embodiments of the present disclosure may be utilized with data owners having more than three user devices or less than three user devices. Further, it is noted that some users may have multiple user devices, such as a laptop or desktop computing device, a tablet computing device, a smartphone, a personal digital assistant, or other types of devices configured to interact and provide input data on behalf of one or more users to data owner 102.

One or more processors 142 are preferably configured to introduce noise corresponding to and satisfying a first privacy loss requirement to the input data to produce noisy input data 149. The first privacy loss requirement may correspond to a differential privacy (DP) requirement represented by epsilon ε (e.g., ε-DP), where ε is a positive, real number that mathematically represents a privacy loss associated with data. For example, a randomized mechanism M gives ε-DP for every set of outputs R, and for any neighbor data of D and D', if M satisfies:

$$\Pr\,[M(D) \in R] \leq \exp(\varepsilon) \times \Pr\,[M(D') \in R]$$

A smaller ε represents a stronger privacy level. Where ε is equal to 0, for any neighbor dataset, the randomized mechanism M may output two identical results of the same probability distribution, which may not reflect useful information. If ε is selected as too large value in a differential privacy mechanism, it does not mean that privacy is actually enforced by the mechanism. In another aspect, the first privacy loss requirement may correspond to a Laplace mechanism that adds Laplace noise (i.e., noise from a Laplace distribution). For example, for a dataset D and a query function $f: D \rightarrow R$ with sensitive $\Delta f$, privacy mechanisms M (D)=F(D)+γ provides ε-DP, where γ~lap $$\left(\frac{\Delta f}{\varepsilon}\right)$$

represents noise sampled from a Laplace distribution with scaling of $$\left(\frac{\Delta f}{\varepsilon}\right).$$

Though this example use Laplace noise, other forms of noise, such as Gaussian Noise may be employed by relaxing the definition of differential privacy.

According to embodiments, the first privacy loss requirement may be set by data owner 102. Additionally or alternatively, the first privacy loss requirement may be set by consensus among various data owners. For example, data owner 102 may communicate with other data owners (e.g., corresponding to data owners 220 and 230, shown in FIG. 2 and discussed in detail below) via network(s) 130 to agree on a first privacy loss requirement. Data server 140 of embodiments may further transmit noisy input data 149 to modelling device 110 to facilitate machine learning consistent with federated learning operations described herein. In alternative embodiments, data server 140 may transmit noiseless input data that has been anonymized and/or encrypted, as discussed in more detail below, to modelling device 110. It is noted that the data stored in database 148 may be separate from the noisy input data 149.

In additional embodiments, processor(s) 142 may be configured to anonymize input data to remove personally identifiable information, so that the individuals to whom the input data correspond remain anonymous. Anonymization enables information to be transferred across a boundary such as, for example, between data server 140 and modelling device 110, while reducing the risk of unintended disclosure (e.g., private information, sensitive information, other forms of protected information consistent with operations described herein). For example, in the context of medical data, anonymized input data may refer to data from which a patient cannot be identified by the recipient of the information—e.g., by removing the name, residential and email addresses, phone numbers, and full postcode, along with any other information which, in conjunction with other data held by or disclosed to the recipient, could identify the patient. In another example, in the context of financial information, anonymizing data may involve removing the name, government identification number, email addresses, and other forms of identifying information consistent with operations described herein. Anonymization of embodiments herein may include redactions, pseudonymization, and other anonymization techniques consistent with operations described herein. Additionally or alternatively, processor(s) 142 may be configured to encrypt the input data, in accordance with techniques discussed below with respect to modelling device 110. In an aspect, the input data may be stored in one or more databases 148 in an anonymized and/or encrypted fashion. Moreover, should data server 140 be compromised by a malicious actor, the anonymized and/or input data corresponding to users associated with user devices 160A, 160B, and 160C would remain secure.

As shown in FIG. 1, modelling device 110 of embodiments includes one or more processors 112, a memory 114, a modelling engine 120, one or more communication interfaces 122, and one or I/O devices 124. One or more processors 112 may include similar types of processors as described above with respect to processor(s) 142. Likewise, memory 114 may include similar types of memory as described above with respect to memory 144. Software configured to facilitate operations and functionality of the modelling device 110 may be stored in the memory 114 as instructions 116 that, when executed by processor(s) 112, cause the processor(s) to perform the operations described in more detail below with respect to modelling device 110. Additionally, memory 114 may be configured to store one or more databases 118. Exemplary aspects of the one or more databases 118 are described in more detail below.

The one or more communication interfaces 122 may be configured to communicatively couple the modelling device 110 to one or more networks 130 via wired or wireless communication links established according to one or more communication protocols or standards consistent with those discussed above with respect to communication interface(s) 150. Likewise, one or more I/O devices 124 may include one or more similar devices as discussed above with respect to I/O device(s) 152.

In aspects, the ML model may include features, hyperparameters, parameters, or other types of information that may enable the ML model to evaluate a set of input data (e.g., noisy input data 149), determine characteristics of the input data, and apply labels to or generate predictions based on at least a portion of the input data based on the characteristics. Features may include individual measurable properties corresponding to the input data (e.g., noisy input data 149 corresponding to and satisfying a first loss privacy loss requirement or "raw," noiseless input data that has been anonymized and/or encrypted according to operations discussed herein) being observed. Parameters may be characteristics of the ML model that are learned from or estimated from the input data and that may be used by the ML model to evaluate the input data. Hyperparameters may be configured to specify how a particular ML model learns (e.g., tune the learning capabilities of the ML model and parameters). It is noted that the particular types of model data (e.g., corresponding to model data 126) may depend on what classification/clustering machine learning algorithms are used. For example, where neural network models are utilized, the parameters may be biases (e.g., a bias vector/matrix), weights, or gradients and where regression-based machine learning algorithms are utilized, the parameters may be differential values. Regardless of the particular type of machine learning algorithm(s) that are utilized, these parameters may be used by the model according to the concepts disclosed herein.

Modelling engine 120 of embodiments may be configured to generate and/or modify a ML model to produce model data 126. In operation according to embodiments, modelling device 110 may transmit model data 126 to coordinator 170 via one or more communication networks (e.g., network(s) 130). Model data 126 preferably includes parameters, hyperparameters, or combinations thereof. Additionally, model data 126 may include features and/or target variable(s). The details and operation of coordinator 170 are described below in relation to FIG. 2. Modelling device 110 may further be configured to store model data 126 in one or more databases 118. Additionally or alternatively, modelling device 110 may transmit model data 126 to data server 140 via one or more networks 130 for storage in database 148.

Additionally or alternatively, modelling engine 120 may be configured to perform operations for training ML models based on a target variable. For example, model data 126 generated by the modelling engine 120 may be configured to analyze data based on one or more features to provide identifying or labelling information. As modelling engine 120 trains the ML model, the parameters of model data 126 may converge to particular values over a training period (e.g., minutes, hours, days, weeks, months, etc.). In an aspect, target variables may vary depending on available data to modelling engine 120 and the particular analytics to performed. For example, data owners 102 may be a bank assessing a loan application, and the target variable may be the credit worthiness of the loan applicant. In another example, data owners 102 may be a life insurance company assessing a policy applicant, and the target variable may correspond to the applicant's health status. In yet another example, data owner 102 may be a university assessing applicants, and the target variable may correspond to academic achievement. In a further example, data owner 102 may be a bank and the target variable may correspond to identifying suspicious or fraudulent transactions from a multitude of legitimate transactions to comply with anti-money laundering regulation. It is noted that the exemplary types data owners and target variables described above have been provided for purposes of illustration, rather than by way of limitation and the concepts disclosed herein may be readily applied to other types of data owners and analytics/target variables.

Processor(s) 112 are preferably configured to introduce noise corresponding and satisfying a second privacy loss requirement to model data 126. Although the second privacy loss requirement may mathematically represent a privacy loss associated with data, similar to the function of the first privacy loss requirement, the second privacy loss requirement is preferably distinct from the second privacy loss requirement. For example, the second privacy loss requirement may represent a greater or lesser epsilon value or correspond to a different noise algorithm. The second privacy loss requirement may be set by data owner 102. Additionally or alternatively, the second privacy loss requirement may be set by consensus among various data owners. For example, data owner 102 may communicate with data owners 220 and 230, shown in FIG. 2, other via network(s) 130 to agree on a second privacy loss requirement.

In some embodiments, one or more processors 112 may be further configured to encrypt model data 126. For example, model data 126 may be encrypted using, for example, public key cryptosystems such as Rivest-Shamir-Adleman encryption, ElGamal encryption, Goldwasser-Micali encryption, Benaloh encryption; additive homomorphic encryption such as Paillier encryption; somewhat homomorphic encryption such as Sander-Young-Yung encryption, Boneh-Goh-Nissim, Ishai-Paskin encryption; other forms of encryption suitable for operations described herein; or combinations thereof. Additionally or alternatively, processor(s) 112 may encrypt model data 126 using fully homomorphic encryption such as, for example, Homomorphic Encryption library (HElib), Microsoft Simple Encrypted Arithmetic Library (SEAL), TenSEAL, PALISADE, Homomorphic Encryption for Arithmetic of Approximate Numbers (HEAAN), other forms of fully homomorphic encryption suitable for operations described herein; or combinations thereof. The cryptosystem of embodiments preferably supports the Cheon, Kim, Kim and Song (CKKS) encoding scheme, which encrypts approximate values rather than exact values.

In an aspect, homomorphic encryption includes multiple types of encryption schemes that permit different classes of computations, represented as either Boolean or arithmetic circuits, to be performed on the encrypted data without first decrypting the data. These resulting computations are also in encrypted form that, when decrypted, result in an identical output to that produced had the operations been performed on unencrypted data. Homomorphic encryption may be used to preserve the privacy of underlying data when outsourcing storage and computation. This allows data to be encrypted and out-sourced for processing (e.g., to coordinator 170, as described in detail below with respect to FIG. 2), all while encrypted. For example, homomorphic encryption may be used on sensitive data (e.g., health care information, financial information, etc.) to enable new services by removing privacy barriers inhibiting data sharing or increase security to existing services. Predictive analytics in, for example, health care can be hard to apply among multiple data owners due to medical data privacy concerns, but if the predictive analytics may be performed on encrypted data instead, these privacy concerns may be mitigated.

In operation according to embodiments, data owner 102 may receive aggregate model data 172 from coordinator 170. Aggregate model data 172, which is described in further detail below with respect to FIG. 2, may be transmitted directly to modelling device 110, or routed to modelling device 110 by data server 140. For example, for Logistic Regression ML algorithms, model data may include model weights or gradients. Modelling device 110 may use modelling engine 120, to generate new or updated ML models based on aggregate model data 172. For example, aggregate model data 172 may be used to calculate an updated set of parameters for an "updated" model based on a greater amount of parameters to replace the model parameters used by modeling device 110 and corresponding to model data 126. Additionally or alternatively, aggregate model data 172 may be used to retrain ML models that were previously generated by data owner 102 to more accurately identify or determine a target variable. For example, modelling device 110 may configure a local ML model to utilize model parameters and/or hyperparameters included in aggregate model data 172 and retrain the ML model using noisy input data 149 and a particular target variable. It is noted that since each data owner may separately generate and/or train an ML model and contributes its own model data (e.g., corresponding to model data 126, 226, and 236, discussed in detail below with respect to FIG. 2) to coordinator 170, modelling device 110 corresponding to data owner 102 may therefore receive aggregate model data 172 containing information that is new to data owner 102 but has been available to other data owners. This new information (with respect to data owner 102) may be included in the individual model data that the other data owners provided to coordinator 170 and which is aggregated into a current instance of a global model (e.g., corresponding to aggregate model data 172), as described in more detail below with respect to FIG. 2.

Figure 2:
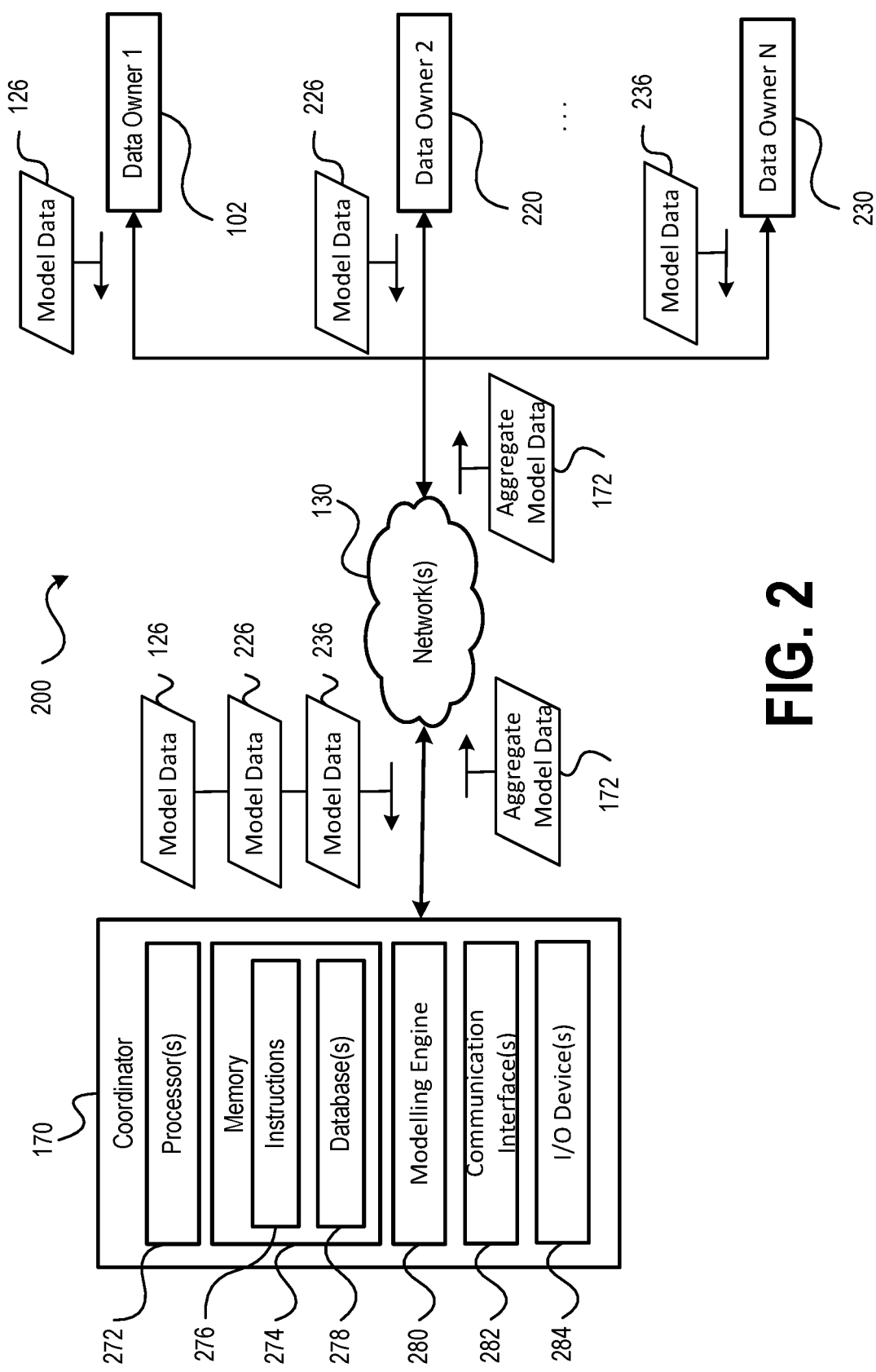
FIG. 2 is a block diagram illustrating aspects of performing federated learning differential privacy in accordance with embodiments of the present disclosure.

Referring to FIG. 2, a block diagram illustrating aspects of providing differential privacy enhancements to federated learning is shown as a system 200. It is noted that FIGS. 1 and 2 use like reference numbers to represent the same or similar components except where otherwise noted. Further, it is noted that the concepts described and illustrated with respect to the system 200 of FIG. 2 may be implemented and utilized by the system 100 of FIG. 1 and vice versa. System 200 depicts coordinator 170 in communication with the data owner 102 via one or more networks 130, and coordinator 170 may also be communicatively coupled with one or more other data owners 220 and 230 via network(s) 130. Although not illustrated in FIG. 2, to simplify the drawing, data owners 220 and 230 may include data servers and modelling devices similar to those described above with reference to data owner 102 of FIG. 1. It is also noted that FIG. 2 illustrates three data owners (e.g., data owners 102, 220, and 230) for purposes of illustration, rather than by way of limitation, and that embodiments of the present disclosure may include more than three data owners or less than three data owners. Additionally, coordinator 170 is depicted in FIG. 2 as separate from data owners 102, 220, and 230 as an example, but in some embodiments, the functionality described as being provided by coordinator 170 may be provided by the infrastructure of a data owner (e.g., one of data owners 102, 220, and/or 230).

As shown in FIG. 2, coordinator 170 of embodiments may include one or more servers having one or more processors 272, memory 274, one or more communication interfaces 282, and I/O devices 284. One or more processors 272 may include similar types of processors as described above with respect to processor(s) 142. Likewise, memory 274 may include similar types of memory as described above with respect to memory 144. Software configured to facilitate operations and functionality of coordinator 170 may be stored in the memory 274 as instructions 276 that, when executed by processor(s) 272, cause the processor(s) to perform the operations described in more detail below with respect to coordinator 170. Additionally, memory 274 may be configured to store one or more databases 278. Exemplary aspects of the one or more databases 278 are described in more detail below. Some embodiments of coordinator 170 may include modelling engine 280, the exemplary operations of which are discussed below.

The one or more communication interfaces 282 may be configured to communicatively couple the coordinator 170 to one or more networks 130 via wired or wireless communication links established according to one or more communication protocols or standards consistent with those discussed above with respect to communication interface(s) 150. Likewise, one or more input/output I/O devices 284 may include one or more similar devices as discussed above with respect to I/O device(s) 152.

As described above with reference to the system 100 of FIG. 1, coordinator 170 may receive model data 126 from data owner 102 via network(s) 130. As shown in FIG. 2, coordinator 170 may also receive model data 226 and 236 from data owners 220 and 230, respectively. Model data 226 and 236 may be generated by data owners 220 and 230 using their respective modelling devices (e.g., corresponding to data owner 102's modelling device 110) and based on their respective input data (e.g., corresponding to input data stored in data owner 102's database(s) 148). In some embodiments, data owners 102, 220, and 230 may communicate with each other to align their respective ML models with respect to a particular aspect of the model and its capabilities. For example, data owner 102 may seek run a machine learning model based on a particular user and communicate the identity of the user (e.g., name) via encrypted messaging to data owners 220 and 230 so that they may each individually evaluate their respective ML models based on input data corresponding to the user.

In operation according to embodiments, data owners 220 and 230 are preferably configured to also introduce noise corresponding to and satisfying first and second privacy loss requirements to their respective input data (e.g., corresponding to data owner 102's noisy input data 149) and model data (e.g., model data 226 and 236), consistent with operations described above with respect to data owner 102. In some embodiments, the first and second privacy loss requirements utilized by data owners 220 and 230 may correspond to the first and second privacy loss requirements utilized by data owner 102. For example, data owners 102, 220, and 230 may communicate with each other via network(s) 130 to reach a consensus to set common first and second privacy loss requirements to be used by the data owners. Alternatively, data owners 220 and 230 may each set their own respective first and second privacy loss requirements, which may be different from the first and second privacy loss requirement utilized by data owner 102 (e.g., different epsilon value, different noise algorithm, etc.). It is noted that the first and second privacy loss requirements may be tunable or adjustable, such that one group of entities may utilize a first set of first and second privacy loss requirements and another group of entities may utilize a second set of first and second privacy loss requirements that are different from the first set of first and second privacy loss requirements.

Referring again to coordinator 170 of FIG. 2, processor(s) 272 may be configured to combine model data 126, 226, and 236 into aggregate model data 172. As described above with respect to FIG. 1, model data 126 may include parameters, hyperparameters, features, target variable(s), or combinations thereof corresponding to a ML model generated by data owner 102 (e.g., using modelling device 110) based on noisy input data 149. For example, for Logistic Regression ML algorithms, model data may include model weights or gradients. Likewise, model data 226 and 236 may include similar types of modelling information corresponding to ML models generated by data owners 220 and 230, respectively. It is noted that since each data owner (e.g., one or more of data owners 102, 220, and 230) has its own respective input data (e.g., corresponding to noisy input data 149), each individual data owner's ML data may not have all the relevant data points that could be relevant within a particular federated learning ecosystem. For example, a bank (e.g., data owner 102) may assessing an online merchant (e.g., data owner 220) for a loan application may have data on the subset of the merchant's credits and debits, but not relevant data about the merchant's transaction history (e.g., data owner 220's customer transactions) or the types of expenditures or expenses that the merchant may have (e.g., data owner 230 representing another bank, another merchant conducting transactions with the applicant merchant, etc.). Using aggregate model data 172 according to the concepts disclosed herein enables one data owner evaluate a user based on these other metrics without necessarily having access to the underlying data itself.

Preferably, processor(s) 272 are further configured to introduce noise corresponding to and satisfying a third privacy loss requirement to aggregate model data 172. Although the third privacy loss requirement may mathematically represent a privacy loss associated with data, similar to the function of the first privacy loss requirement, the third privacy loss requirement is preferably distinct from the first and second privacy loss requirements. For example, the third privacy loss requirement may represent a greater or lesser epsilon value or correspond to a different noise algorithm. In some embodiments, the third privacy loss requirement is set by coordinator 170. Additionally or alternatively, the third privacy loss requirement may be set based on instructions received from the various data owners (e.g., one or more of data owners 102, 220, and 230). For example, data owners 102, 220, and 230 may communicate with each other via network(s) 130 to reach a consensus and dictate the third privacy loss requirement to coordinator 170 over network(s) 130.

In operation according to embodiments, coordinator 170 may transmit aggregate model data 172 to one or more of data owners 102, 220, and 230 to facilitate subsequent ML modelling iterations by the modelling device(s) (e.g., corresponding to modelling device 110 of FIG. 1) of one or more of data owners 102, 220, and 230. For example, aggregate model data 172 may include encrypted model weights or gradients (e.g., corresponding to parameters of model data 126, 226, and 236), and a data owner (e.g., corresponding to data owner 102) may update its ML model according to the aggregated weights or gradients. Additionally, coordinator 170 may store aggregate model data 172 in database(s) 278. In some embodiments, modelling engine 280 of coordinator 170 may be configured to generate or update a global ML model based on model data 126, 226, and 236. As such, aggregate model data 172 may therefore represent a ML model based on model data 126, 226, and 236. Preferably, when one or more of data owners 102, 220, 230 receive aggregate model data 172, the ML models generated by the respective modelling devices (e.g., corresponding to modelling device 110 of FIG. 1) corresponding to each of the different data owners may be separately updated and/or retrained based on aggregate model data 172, as described above with respective to FIG. 1.

It is noted that the model data (e.g., model data 126, 226, and 236) that coordinator 170 receives from each of the data owners 102, 220, and 230 are locally generated and/or trained using modelling devices (e.g., corresponding to modelling device 110) based on input data received by each respective data owner, as described above with respect to FIG. 1. For example, model data 126 may be generated based on using input data received by data owner 102, model data 226 may be generated based on input data received by the data owner 220, and model data 236 may be generated based on input data received by the data owner 230. In an aspect, the input data corresponding to each data owner may be distinct from each other, although there may be some overlapping information. For example, as illustrated in FIG. 4, model data 410, 420, and 430 may correspond to the model data of data owners 102, 220, 230, respectively (e.g., corresponding to model data 126, 226, and 236, respectively). Although model data 410, 420, and 430 may share common identifiers (e.g., $ID_1$, $ID_2$, $ID_3$, $ID_4$, $ID_5$, $ID_6$, etc.), each model contains distinct or overlapping features corresponding to the identifiers, corresponding to the respective input data available to each data owner. In operation according to embodiments, data owner 102 may utilize aggregate model data 172 to identify labels, as depicted in model data 410 of FIG. 4. In another example illustrated in FIG. 5, model data 510, 520, and 530 may correspond to the model data of data owners 102, 220, 230, respectively (e.g., corresponding to model data 126, 226, and 236, respectively). In this example, model data 510, 520, and 530 may share common features (e.g., f(1), f(2), f(3), f(N), etc.), but each model contains distinct and/or overlapping identifiers corresponding to the respective input data available to each data owner. As such, the aggregate model data 172 distributed by coordinator 170 may represent a global set of model data corresponding to the local model data of data owners 126, 220, and 230. In operation according to embodiments, one or more of data owners 102, 220, 230 may utilize aggregate model data 172 to identify labels, as depicted in model data 510, 520, and 530 of FIG. 5.

Thus, system 200 facilitates training of ML models in a federated manner, and the differential privacy afforded by the hierarchical privacy loss requirements introduced by each data owner (e.g., one or more of data owners 102, 220, and 230) to their respective input data and model data (e.g., model data 126, 226, and 236) allow each data owner's input data and modelling data to be shared among each other without exposing private information. To illustrate, in providing data owner 102 with aggregate model data 172, data owner 102 may use aggregate model data 172 to aid in identification of a target variable based on a greater set of data than available to data owner 102 based solely on its own respective input data.

For example, data owner 102 and data owner 220 may be competitor banks, each with a privacy interest in their respective collection of accounts and their customer's individual privacy. However, data owner 102 and data owner 220 may be interested in sharing their respective information to assess the credit worthiness of a loan applicant. In this example, the credit worthiness of a loan applicant may be a target variable, and federated learning, enhanced by differential privacy in accordance with operations described herein, would allow data owner 102 and data owner 220 to generate, train, and share model data (e.g., corresponding to model data 126 and 226 of FIG. 2) based on a target variable corresponding to credit worthiness. Moreover, the loan applicant in this example may itself be a merchant (e.g., corresponding to data owner 230 of FIG. 2) having transactional data (e.g., corresponding to input data) corresponding to its customers that may be modelled, shared, and aggregated in accordance with operations described herein to facilitate generating and training robust ML models based on the credit worthiness target variable. In another example, data owner 102 may be a life insurance company assessing a policy applicant based on a target variable corresponding to health status. As such, data owner 102 may be interested in obtaining model data from various hospitals (e.g., corresponding to data owners 220 and 230 of FIG. 2) to generate and/or train a robust ML model based on health status as a target variable, in accordance with operations described herein. It is noted that the exemplary features identified above have been provided for purposes of illustration, rather than by way of limitation and other features may be analyzed by models generated in accordance with embodiments of the present disclosure.

Additionally, differential privacy afforded by the first, second, and third privacy loss requirements applied by the data owners (e.g., corresponding to one or more of data owners 102, 220, and 230) and the coordinator (e.g., corresponding to coordinator 170), prevent data owners' input data or model data from being exposed or reverse-calculated to obtain private user information or proprietary modelling analytics. It is noted that three privacy loss requirements have been discussed above with respect to FIGS. 1 and 2 for purposes of illustration, rather than by way of limitation and the embodiments of the present disclosure utilize more than three or less than three privacy loss requirements. For example, referring to FIG. 3, a ladder diagram illustrating aspects of providing differential privacy enhancements to federated learning is shown as a system 300. It is noted that FIGS. 1, 2, and 3 use like reference numbers to represent the same or similar components except where otherwise noted. Further, it is noted that the concepts described and illustrated with respect to FIG. 3 may be utilized by systems 100 and 200 of FIGS. 1 and 2, and vice versa. FIG. 5 depicts coordinator 170 in communication with the data owner 102 (e.g., via one or more networks 130 of FIGS. 1 and 2).

According to FIG. 5, data owner 102 may receive information from sub-data owners 322, 324, and 326. Sub-data owners 322, 324, and 326 may be users of devices that are communicatively coupled to data owner 102 (e.g., corresponding to user devices 160A, 160B, and 160C of FIG. 1). For example, data owner 102 may be a bank, and sub-owner 322 may be an individual who has an account with data owner 102. In another example, data owner 102 may be an online merchant, and sub-owner 322 may be an individual who has engaged in a transaction with data owner 102. In yet another example, data owner 102 may be an insurance provider, and sub-owner 322 may be an individual who has a policy with data owner 102. In a further example, data owner 102 may be an utility provider (e.g., gas, electric, water, etc.), and sub-owner 322 may be an individual who has an account with data owner 102. As illustrated, in FIG. 1, the user devices (e.g., user devices 160A, 160B, and 160C of FIG. 1) corresponding to sub-data owners 322, 324, and 326 may be communicatively coupled to data owner 102's data server 140 via communication interface(s) (e.g., over one or more networks 130) and I/O device(s) 152. It is noted that although FIG. 5 depicts three sub-data owners for purposes of illustration, rather than by way of limitation, and the embodiments of the present disclosure may include a more or less than three sub-owner communicating with data owner 140 using user devices (e.g., user devices 160A, 160B, and 160C of FIG. 1).

In operation according to embodiments, sub-data owners 322, 324, and 326 may transmit private data 323, 325, and 327, respectively, to data owner 102 for storage in memory as input data (e.g., corresponding to input data stored in database 148 of FIG. 1). Private data 323, 325, and 327 may be personal information of sub-data owners 322, 324, and 326 such as, for example, name, age, gender, home and/or email addresses, phone, government identification numbers, bank transactions or balances, academic information (e.g., grades, coursework, etc.), commercial transaction histories, medical records, criminal records, or other types of personal information suitable for operations described herein. In some embodiment, one or more of user devices 160A, 160B, and 160C may be configured to introduce noise corresponding to and satisfying a fourth privacy loss requirement to their respective private data (e.g., corresponding to private data 323, 325, and 327), in accordance with operations described herein, prior to transmitting the same to data owner 102. Additionally or alternatively, private data 323, 325, and 327 may be anonymized or encrypted, in accordance with operations described herein, prior to transmitting the same to data owner 102. In an aspect, private data 323, 325, and 327 is received by data owner 102 as input data, which is used to generate model data 126. And as discussed above with respect to FIGS. 1 and 2, data owner 102 may transmit data 126 to coordinator 170 and receive aggregate model data 172 from coordinator 170, in accordance with federal learning operations discussed herein. It is noted that FIG. 5 illustrates sub-data owners communicating with data owner 102 for purposes of illustration, rather than limitation, and the embodiments of the present disclosure may one or more sub-data owners communication with multiple data owners (e.g., corresponding to at least data owners 102, 220 and 230 of FIG. 2).

Figure 3:
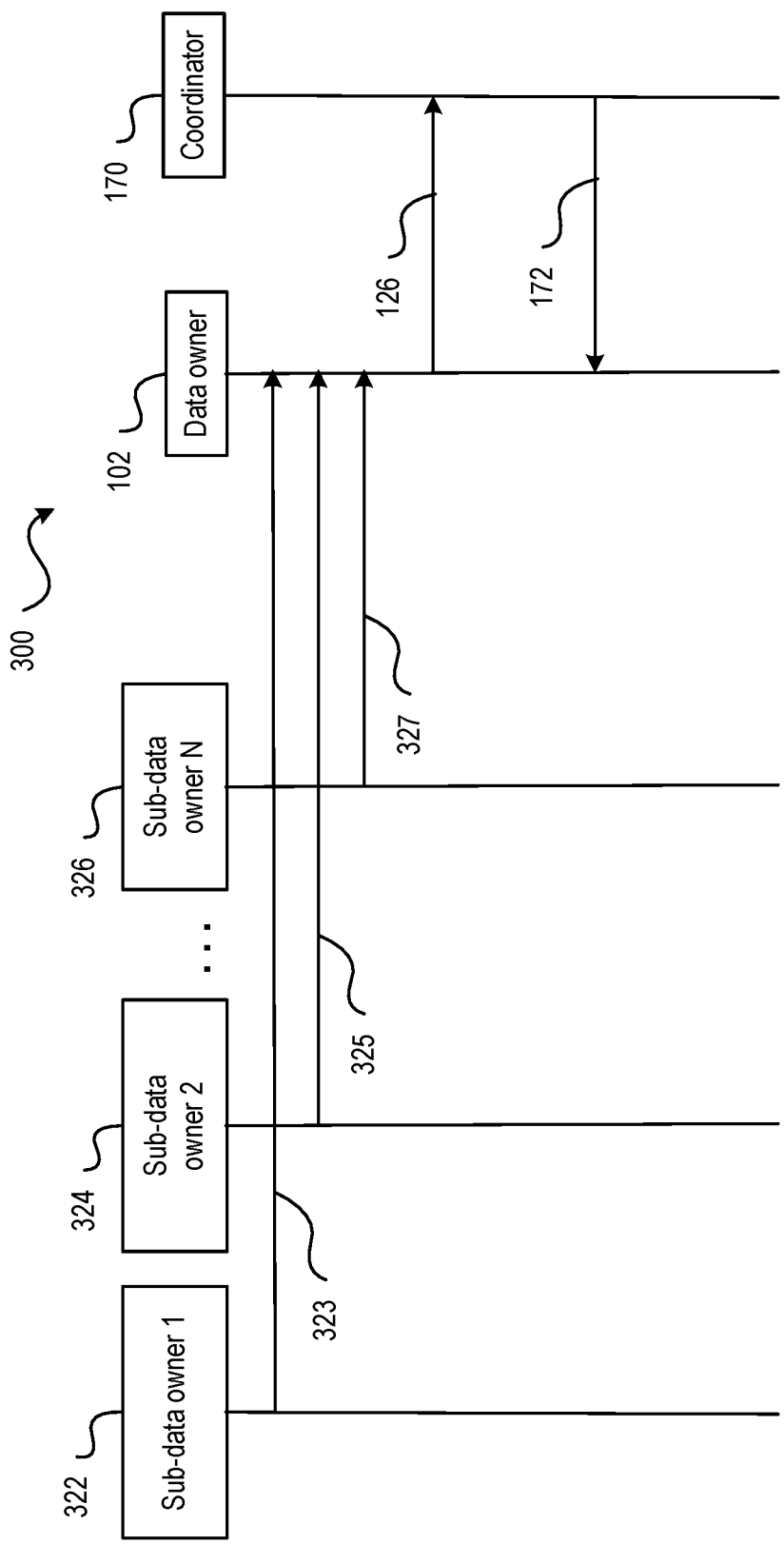
FIG. 3 is a ladder diagram illustrating aspects of a process for performing federated learning with differential privacy in accordance with embodiments of the present disclosure.

It is further noted that FIGS. 1-3 depict a single coordinator 170 for purposes of illustration, rather than by way of limitation, and the embodiments of the present disclosure may include a one or more coordinators communicatively coupled to each together and functioning in accordance with operations described herein with respect to each other instead of with respect to data owners. For example, coordinator 170 may be a regional coordinator that facilitates federated learning and differential privacy for data owners 102, 220, and 230. Coordinator 170 may also be communicative coupled via network(s) 130 to a higher-tier coordinator configured to facilitate federated learning and differential privacy between coordinator 170 and one or more other regional coordinators that each facilitate federated learning and differential privacy among their respective data owners. Aggregate model data 172, as discussed above, may be shared from coordinator 170 to the higher-tier coordinator for further aggregation with aggregate model data from other regional coordinators. The higher-tier coordinator preferably applies noise corresponding to a fourth privacy loss requirement to the super-set of aggregated model data received from the multiple regional coordinators and distributes the super-set of aggregated model data to the regional coordinators to facilitate ML modelling by their respective data owners. Additionally or alternatively, the higher-tier coordinator may anonymize or encrypt the super-set of aggregated model data, in accordance with operations described herein.

The use of differential privacy according to embodiments of the present disclosure to enhance federated learning may provide additional advantages over previous approaches to machine learning. For example, the privacy enhancements described herein may improve the ability to perform federated learning using divergent data sets corresponding to various data owners while maintaining the privacy of the underlying input data or proprietary modelling data performed by the various data owners. In horizontal federated learning, one or more data owners may align to perform federated modelling based on common features between the data owners. For example, data owners 102, 220, and 230 (e.g., of FIG. 2) may communicate over network(s) 130 to perform federated learning based each data owner's respective model data (e.g., corresponding to model data 510, 520, and 530 of FIG. 5) corresponding to common features (e.g., corresponding to f(1), f(2), f(3), etc. of FIG. 5), thereby benefiting from aggregate model data (e.g., corresponding to aggregate model data 172 of FIGS. 1-2) containing data for users that may not be initially available to a single data owner. And in vertical federated learning, one or more data owners may align to perform federated modelling based on a common user between the data owners. For example, data owners 102, 220, and 230 (e.g., of FIG. 2) may communicate over network(s) 130 to perform federated learning based each data owner's respective model data (e.g., corresponding to model data 410, 420, and 430 of FIG. 4) corresponding to common user (e.g., corresponding to $ID_4$ of FIG. 4), thereby benefiting from aggregate model data (e.g., corresponding to aggregate model data 172 of FIGS. 1-2) containing features that may not be initially available to a single data owner.

In either horizontal or vertical federated learning, applying differential privacy in accordance with operations described herein preserves the privacy of user input data and sensitive data owner analytics. Accordingly, embodiments of the present disclosure provide an improved process for federated learning while ensuring and maintaining data privacy. In additional aspects, the data owners (e.g., corresponding to one or more of data owners 102, 220, and 230 of FIGS. 1-2) and/or coordinators (e.g., corresponding to one or more of coordinator 170 of FIGS. 1-2) may use a secure enclave to ensure that information utilized in operations described herein (e.g., one or more of "raw" input data, noisy input data 149, model data 126, 226, and 236, aggregate model data 172) may be secured against unintended exposure (e.g., access other than transmissions according to operations described herein). For example, data owners 102, 220, and 230 may utilize secure enclaves to protect their respective model data (e.g., corresponding to model data 126, 226, and 236) in lieu of encryption, as described above.

Figure 6:
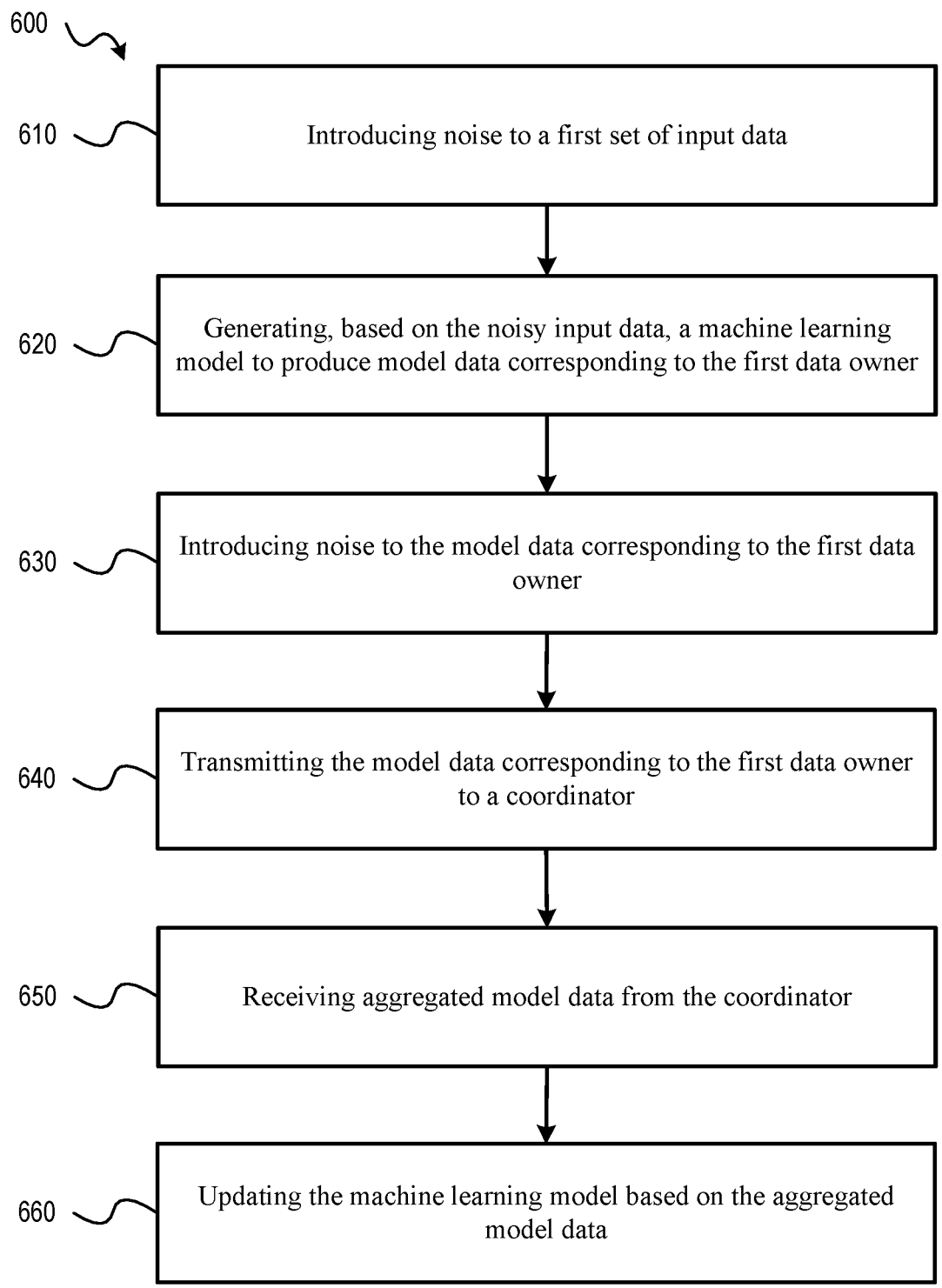
FIG. 6 is a flow diagram of a method for performing federated learning with differential privacy in accordance with embodiments of the present disclosure.

Referring to FIG. 6, a flow diagram of method 600 for providing differential privacy to federated learning is shown. In aspects, the operations of method 600 may be stored as instructions (e.g., corresponding to instructions 116 and/or 146 of FIG. 1) that, when executed by one or more processors (e.g., corresponding to one or more processors 112 and/or 142 of FIG. 1), cause the one or more processors to perform the steps of method 600. In aspects, method 600 may be performed by a modelling device (e.g., corresponding to modelling device 110 of FIG. 1), a data server (e.g., corresponding to data server 140 of FIG. 1), or combinations thereof. Additionally, the modelling device may include a modelling engine (e.g., corresponding to modelling engine 120 of FIG. 1) and at least a portion of the steps of method 600 may be performed by the modelling engine.

At step 610, method 600 includes introducing noise to a first set of input data (e.g., corresponding to input data stored in database 148 of FIG. 1). The first set of input data may correspond to information received from one or more user devices (e.g., corresponding to one or more user devices 160A-C of FIG. 1). The user devices may be associated with one or more sub-owners (e.g., corresponding to one or more sub-owners of FIG. 3). In an aspect, introducing noise to the first set of input data results in noisy input data (e.g., corresponding to noisy input data of FIG. 1). Preferably, the noise introduced to the input data corresponds to and satisfies a first privacy loss requirement, as described herein with respect to FIGS. 1-2. In some embodiments, the first privacy loss requirement is determined by the modelling device. Alternatively, the first privacy loss requirement is determined by reaching a consensus with one or more other data owners (e.g., corresponding to data owners 220 and 230 of FIG. 2). Additionally, method 600 may also include an additional step for anonymizing and/or encrypting the set of input data corresponding to the first data owner prior to or after step 610 (e.g., corresponding to operations of one or more processors 112 of FIG. 1).

At step 620, method 600 includes generating, based on the noisy input data (e.g., corresponding to noisy input data 149 of FIG. 1), a machine learning model (e.g., corresponding to a ML model generated by modelling engine 120 of FIG. 1) to produce model data corresponding to the first data owner (e.g., corresponding to model data 126 of FIG. 1). In an aspect, the generated model data may include one or more of model parameters, hyperparameters, features, labels, gradients, losses, and target variables corresponding to a ML model (e.g., a "raw" ML model or an updated ML model based on aggregate model data). In some embodiments, method 600 may include an additional step for training the ML model corresponding to the first data owner on a target variable, after step 620. In such embodiments, the model data corresponding to the first data owner may include information regarding the target variable. In some embodiments, the target variable may be separately transmitted to one or more other data owners (e.g., corresponding to one or more data owners 220 and 230 of FIG. 2) to facilitate ML modelling based on their respective input data and the target variable corresponding to the first data owner.

At step 630, method 600 includes introducing noise to the model data corresponding to the first data owner. The noise introduced to the model data corresponding to the first data owner preferably corresponds to and satisfies a second privacy loss requirement that is distinct from the first privacy loss requirement. For example, the second privacy loss requirement may be greater than, less than, or based on a different algorithm than the first privacy loss requirement. In some embodiments, method 600 may further include encrypting the model data corresponding to the first data owner prior to or after steps 630. For example, the model data corresponding to the first data owner may be encrypted using homomorphic encryption.

At step 640, method 600 includes transmitting the model data corresponding to the first data owner to a coordinator. Preferably, the coordinator (e.g., corresponding to coordinator 170 of FIGS. 1-2) is configured to aggregate the model data corresponding to the first data owner (e.g., corresponding to model data 126 of FIG. 1-2) with model data corresponding to one or more other data owners (e.g., corresponding to model data 226 and 236 of data owners 220 and 230 of FIG. 2). The coordinator may be also configured to introduce noise corresponding to and satisfying a third privacy loss requirement to the aggregated model data (e.g., corresponding to aggregate model data 172 of FIGS. 1-2), consistent with operations described herein. The third privacy loss requirement is preferably distinct from the first and/or second privacy loss requirements. For example, third privacy requirement may be greater than, less than, or based on a different algorithm than the first and/or second privacy loss requirements.

At step 650, method 600 includes receiving aggregated model data (e.g., corresponding to aggregate model data 172 of FIGS. 1-2) from the coordinator. For example, the aggregated model data may be received as transmissions over one or more communication networks (e.g., corresponding to network(s) 130). In an aspect, the aggregated model data may be received by the first data owner's modelling device, data server, or a combination thereof. The aggregated model data is preferably configured to facilitate subsequent modelling iterations of the machine learning models by the first data owner and/or the one or more other data owners.

At step 660, method 600 includes updating the machine learning model based on the aggregated model data received from the coordinator. In an aspect, the modelling device may generate an "updated" ML model based on the "raw" ML model and the aggregated model data. In some embodiments, the aggregate model data may include model data corresponding to the one or more other data owners that were generated based on the target variable corresponding the first data owner. As such, method 600 may include an additional step for retraining the ML model corresponding to the first data owner based on the aggregate model data and the target variable used to train the "raw" ML model.

Figure 7:
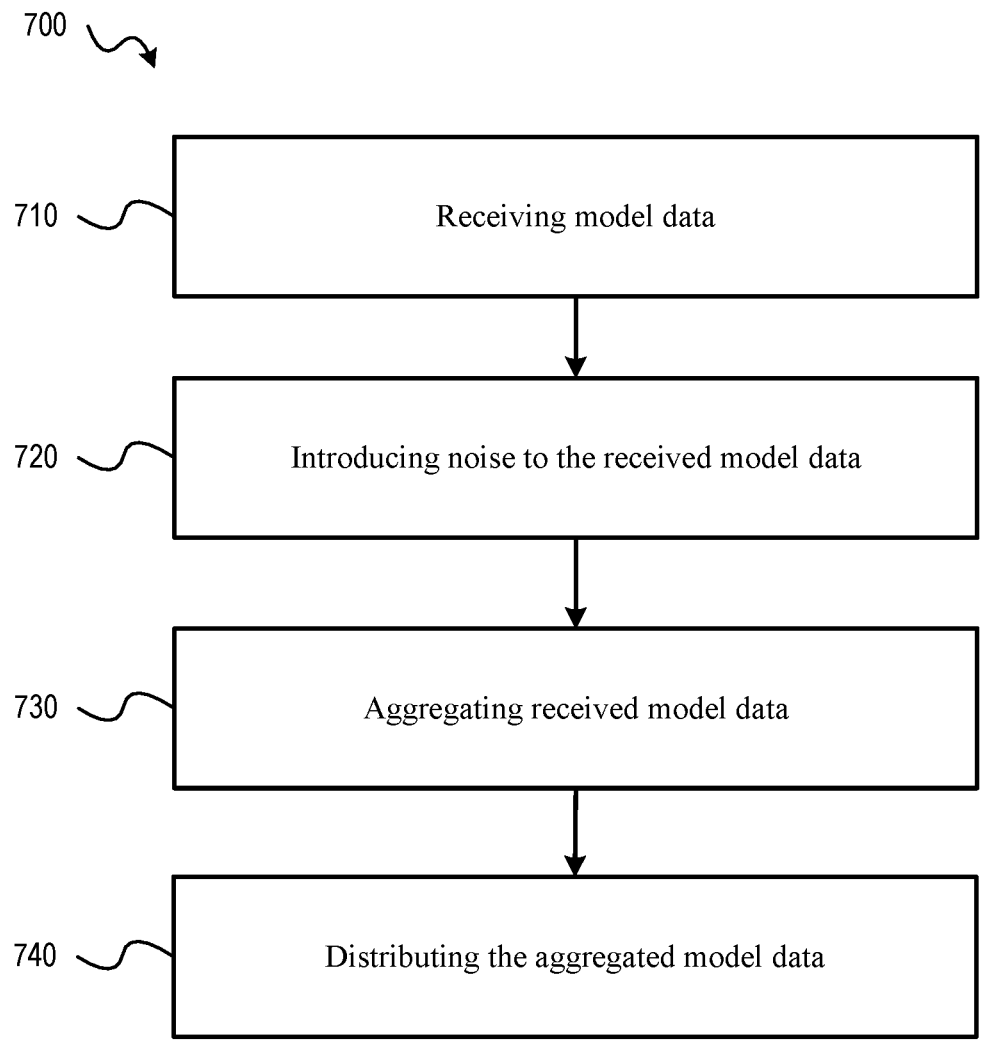
FIG. 7 is a flow diagram of a method for performing federated learning with differential privacy in accordance with embodiments of the present disclosure.

Referring to FIG. 7, a flow diagram of a method for providing differential privacy to distributed modelling is shown. In aspects, the operations of the method 700 may be stored as instructions (e.g., the instructions 276 of FIG. 2) that, when executed by one or more processors (e.g., the one or more processors 272 of FIG. 2), cause the one or more processors to perform the steps of the method 700. In aspects, the method 700 may be performed by a coordinator, such as coordinator 170 of FIG. 1. Additionally, the coordinator may include a modelling engine (e.g., the modelling engine 280 of FIG. 2) and at least a portion of the steps of the method 700 may be performed by the modelling engine.

At step 710, method 700 includes receiving model data (e.g., corresponding to model data 126, 226, and 236 of FIG. 2). The model data may have been produced from a machine learning model generated by a first data owner (e.g., corresponding to modelling engine 120 of data owner 102 of FIG. 1). Additionally, the model data may have been produced from machine learning models generated by one or more other data owners (e.g., corresponding to modelling engine 120 of data owners 220 and 230 of FIG. 2). The received model data may include, for example, model parameters, hyperparameters, gradients, losses, target variables, or other machine learning attributes suitable for operations described herein. Also, the received model data preferably includes noise corresponding to and satisfying a second privacy loss requirement. According to embodiments, the received model data are generated based on sets of input data corresponding to the first data owner and the one or more second data owners. Preferably, the sets of input data include noise that corresponds to and satisfies a first privacy loss requirement.

In an aspect, the first privacy loss requirement and the second privacy loss requirement are distinct. For example, the second privacy loss requirement may be greater than or less than the first privacy loss requirement. Further, the received model data corresponding to the first data owner and corresponding to the one or more other data owners may have been encrypted in accordance with operations described herein. For example, the received model data corresponding to the first data owner and the received model data corresponding to the one or more other data owners may be homomorphically encrypted. Additionally or alternatively, the first set of input data and the one or more second set of input data may be anonymized in accordance with operations described herein.

At step 720, method 700 includes introducing noise to the received model data. The noise introduced to the received model data preferably corresponds to and satisfies a third privacy loss requirement. The third privacy loss requirement is preferably distinct from the first or second privacy loss requirements. For example, the third privacy loss requirement may be greater than or less than the second privacy loss requirement or may be based on a different algorithm than the first or second privacy loss requirements.

At step 730, method 700 includes aggregating the received model data. In some embodiments, the aggregate model data (e.g., corresponding to aggregate model data 172 of FIGS. 1-3) is stored and maintained in memory (e.g., corresponding to database 278 of FIG. 2). It is noted that FIG. 7 depicts step 730 after step 720 for purposes of illustration rather than limitation, and in some embodiments, step 730 may precede step 720. In some embodiments, method 700 may further include generating, based on the received model data corresponding to the first data owner and the one or more other data owners, an aggregated machine learning model, prior to or after steps 720 and/or 730. The aggregated machine learning model is preferably configured to facilitate subsequent modelling iterations of machine learning models corresponding to the first data owner and/or the one or more other data owners. The aggregate model data (e.g., corresponding to aggregate model data 172 of FIGS. 1, 2, and 3) may comprise the aggregated machine learning model.

At step 740, method 700 includes distributing the aggregated model data. In some embodiments, the aggregated model data is distributed to the first data owner. Additionally, the aggregated model data may be distributed to the one or more other data owners. In some embodiments, the aggregate model data may be stored to memory (e.g., corresponding to database 278 of FIG. 2).

As shown above, method 700 provides a robust process of applying dynamic differential privacy to enhance federated learning. As described above with reference to FIGS. 1-5, method 700 provides the advantage that aggregate model data (e.g., corresponding to aggregate model data 172 of FIGS. 1-2) may be provided to a data owner (e.g., corresponding to modelling device 110 or data server 140 of data owner 102 of FIG. 1) without requiring participating data owners (e.g., corresponding to data owners 102, 220, and 230) to share their underlying input data or respective analytics, thereby maintaining the each data owner's privacy and the privacy of their respective users (e.g., customers, patients, students, etc.). It is noted that although data owners may share model data with a coordinator, such as coordinator 170 of FIGS. 1-3, the dynamic application of different privacy at multiple, hierarchical stages of the federated learning process prevents reverse-engineering or exposure. Additionally, the method 700 enables ML models to be generated, trained based on one or more target variables, and shared between different data owners, thereby improving those data owners' ability to perform machine learning that suits the particular needs of the individual data owner. It is noted that, in the embodiments described and illustrated with reference to FIGS. 1-7, the term "raw" model data or ML models may be used to refer to the first time that model data is distributed to a coordinator or other data owners, and all subsequent models that are derived from aggregate data models may be referred to as "updated" or "upgraded" model data or ML models.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-7) may comprise processors, electronics devices, hardware devices, electronics components, logical circuits, memories, software codes, firmware codes, etc., or any combination thereof. In addition, features discussed herein relating to FIGS. 1-7 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 6-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of applying dynamic differential privacy enhancements to federated learning, comprising:
   introducing noise to a first set of input data corresponding to a first data owner to obtain noisy data corresponding to the first data owner, wherein the noise introduced to the first set of input data corresponds to and satisfies a first privacy loss requirement;
   generating, based on the noisy data corresponding to the first data owner, a machine learning model corresponding to the first data owner to produce model data corresponding to the first data owner;
   introducing noise to the model data corresponding to the first data owner, wherein the noise introduced to the model data corresponding to the first data owner corresponds to and satisfies a second privacy loss requirement;
   transmitting the model data corresponding to the first data owner to a coordinator, wherein the coordinator is configured to aggregate the model data corresponding to the first data owner with model data corresponding to one or more other data owners and introduce noise corresponding to and satisfying a third privacy loss requirement to the aggregated model data, and wherein the coordinator is further configured to distribute the aggregated model data to the first data owner and the one or more other data owners;
   receiving the aggregated model data from the coordinator; and
   updating the machine learning model corresponding to the first data owner based on the aggregated model data received from the coordinator.

2. The method of claim 1, wherein the second privacy loss requirement is greater than the first privacy loss requirement.

3. The method of claim 1, wherein the third privacy loss requirement is greater than the second privacy loss requirement.

4. The method of claim 1, further comprising:
   anonymizing the first set of input data corresponding to the first data owner.

5. The method of claim 1, further comprising:
   encrypting model data corresponding to the first data owner.

6. The method of claim 5, further comprising:
   encrypting the model data corresponding to the first data owner using homomorphic encryption.

7. The method of claim 1, wherein the model data corresponding to the first data owner comprises one or more of model parameters, gradients, and losses.

8. The method of claim 1, wherein the model data corresponding to the one or more other data owners are generated based on one or more second sets of input data corresponding to the one or more other data owners, and wherein the one or more second sets of input data include information absent from the first set of input data corresponding to the first data owner.

9. The method of claim 1, further comprising:
   training the machine learning model corresponding to the first data owner on a target variable, wherein the model data corresponding to the first data owner correspond to the target variable; and
   retraining the machine learning model corresponding to the first data owner based on the aggregated model data that include model data corresponding to the one or more other data owners, wherein the model data corresponding to the one or more other data owners are generated based on the target variable.

10. A method of applying dynamic differential privacy enhancements to federated learning, comprising:
   receiving model data corresponding to a first data owner, wherein the model data are produced from a machine learning model generated by the first data owner based on noisy data corresponding to the first data owner, wherein the noisy data corresponding to the first data owner comprises a first set of input data with noise corresponding to and satisfying a first privacy loss requirement introduced, and wherein the model data corresponding to the first data owner include noise corresponding to and satisfying a second privacy loss requirement introduced;

receiving model data corresponding to one or more other data owners, wherein the model data corresponding to one or more other data owners are produced from machine learning models generated by the one or more other data owners based on noisy data corresponding to the one or more other data owners, wherein the noisy data corresponding to the one or more other data owners comprises one or more second sets of input data with noise corresponding to and satisfying the first privacy loss requirement introduced, and wherein the model data corresponding to the one or more other data owners include noise corresponding to and satisfying the second privacy loss requirement introduced;

introducing noise corresponding to and satisfying a third privacy loss requirement to the received model data corresponding to the first data owner and to the one or more other data owners;

aggregating received model data corresponding to the first data owner and to the one or more other data owners; and distributing the aggregated model data to at least one of the first data owner and the one or more other data owners to facilitate subsequent modelling iterations of the machine learning models corresponding to the first data owner and the one or more other data owners.

11. The method of claim 10, wherein the second privacy loss requirement is greater than the first privacy loss requirement.

12. The method of claim 10, wherein the third privacy loss requirement is greater than the second privacy loss requirement.

13. The method of claim 10, wherein the first set of input data are anonymized, and wherein and the one or more second set of input data are anonymized.

14. The method of claim 10, wherein the received model data corresponding to the first data owner are encrypted, and wherein the received model data corresponding to the one or more other data owners are encrypted.

15. The method of claim 14, wherein the received model data corresponding to the first data owner are homomorphically encrypted, and wherein the received model data corresponding to the one or more other data owners are homomorphically encrypted.

16. The method of claim 10, wherein the model data corresponding to the first data owner comprise one or more of model parameters, gradients, and losses, and wherein the model data corresponding to the one or more other data owners comprise one or more of model parameters, gradients, and losses.

17. The method of claim 10, wherein the model data corresponding to the first data owner correspond to a target variable used to train the machine learning model corresponding to the first data owner, and wherein the model data corresponding to the one or more other data owners are produced by training the machine learning models corresponding to the one or more other data owners using the target variable.

18. The method of claim 10, further comprising:
generating, based on the received model data corresponding to the first data owner and the one or more other data owners, an aggregated machine learning model, and wherein the aggregated model data comprises the aggregated machine learning model.

19. A non-transitory computer-readable storage medium storing instructions that, when executed by one or more first processors, cause the one or more first processors to perform operations for applying dynamic differential privacy enhancements to federated learning, the operations comprising:

introducing noise to a first set of input data corresponding to a first data owner to obtain noisy data corresponding to the first data owner, wherein the noise introduced to the first set of input data corresponds to and satisfies a first privacy loss requirement;

generating, based on the noisy data corresponding to the first data owner, a machine learning model corresponding to the first data owner to produce model data corresponding to the first data owner;

introducing noise to the model data corresponding to the first data owner, wherein the noise introduced to the model data corresponding to the first data owner corresponds to and satisfies a second privacy loss requirement;

transmitting the model data corresponding to the first data owner to a coordinator;

receiving aggregated model data from the coordinator; and updating the machine learning model corresponding to the first data owner based on the aggregated model data received from the coordinator.

20. The non-transitory computer-readable storage medium of claim 19, wherein the instructions, when executed by one or more second processors, cause the one or more second processors to perform operations for applying dynamic differential privacy enhancements to federated learning, the operations comprising:

receiving, at the coordinator, the model data corresponding to a first data owner;

receiving, at the coordinator, model data corresponding to one or more other data owners, wherein the model data corresponding to one or more other data owners are produced from machine learning models generated by the one or more other data owners based on noisy data corresponding to the one or more other data owners, wherein the noisy data corresponding to the one or more other data owners comprises one or more second sets of input data with noise corresponding to and satisfying the first privacy loss requirement introduced, and wherein the model data corresponding to the one or more other data owners include noise corresponding to and satisfying the second privacy loss requirement introduced;

introducing noise corresponding to and satisfying a third privacy loss requirement to the received model data corresponding to the first data owner and to the one or more other data owners;

aggregating received model data corresponding to the first data owner and to the one or more other data owners; and distributing the aggregated model data to at least one of the first data owner and the one or more other data owners to facilitate subsequent modelling iterations of the machine learning models corresponding to the first data owner and the one or more other data owners.

* * * * *